United States Patent
Dieckmann et al.

(10) Patent No.: US 12,024,145 B2
(45) Date of Patent: Jul. 2, 2024

(54) METHOD FOR THE EMERGENCY BRAKING OF AN EGO-VEHICLE AND EMERGENCY BRAKING SYSTEM

(71) Applicant: ZF CV Systems Hannover GmbH, Hannover (DE)

(72) Inventors: Thomas Dieckmann, Pattensen (DE); Stephan Kallenbach, Hannover (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 376 days.

(21) Appl. No.: 17/200,991

(22) Filed: Mar. 15, 2021

(65) Prior Publication Data

US 2021/0197776 A1  Jul. 1, 2021

Related U.S. Application Data

(63) Continuation of application No. PCT/EP2019/072421, filed on Aug. 22, 2019.

(30) Foreign Application Priority Data

Sep. 18, 2018 (DE) ...................... 10 2018 122 865.1

(51) Int. Cl.
*B60T 7/22* (2006.01)
*B60Q 9/00* (2006.01)
(Continued)

(52) U.S. Cl.
CPC ............... *B60T 7/22* (2013.01); *B60Q 9/008* (2013.01); *B60T 8/17* (2013.01); *B60T 8/58* (2013.01);
(Continued)

(58) Field of Classification Search
CPC ..... B60T 7/22; B60T 8/17; B60T 8/58; B60T 2201/022; B60T 2210/32; B60Q 9/008; B60W 30/16
(Continued)

(56) References Cited

U.S. PATENT DOCUMENTS

| 9,959,762 | B1 | 5/2018 | Kim et al. |
| 10,023,187 | B2 | 7/2018 | Wulf |

(Continued)

FOREIGN PATENT DOCUMENTS

| CN | 112706736 A | * 4/2021 | ............ B60T 13/745 |
| DE | 10261624 A1 | 7/2004 | |

(Continued)

*Primary Examiner* — Atul Trivedi
(74) *Attorney, Agent, or Firm* — LEYDIG, VOIT & MAYER, LTD.

(57) ABSTRACT

A method for emergency braking of a subject vehicle includes: detecting, using a first surroundings detection system of the subject vehicle traveling in a direction of travel, a front area in front of the subject vehicle; if an object is detected in the front area, determining that a reliable target detection situation is present if at least the following target detection situation criteria are fulfilled: the detected object is a vehicle in front traveling in the direction of travel, the vehicle in front is followed over a minimum following period, in the minimum following period, the same vehicle in front is followed, providing an autonomous emergency braking system which is in an AEBS standby mode during travel outside an emergency braking situation; and if an emergency braking situation is detected outside of a reliable target detection situation, switching the autonomous emergency braking system to an active AEBS mode.

19 Claims, 3 Drawing Sheets

(51) Int. Cl.
*B60T 8/17* (2006.01)
*B60T 8/58* (2006.01)
*B60W 30/06* (2006.01)
*B60W 30/16* (2020.01)

(52) U.S. Cl.
CPC ..... *B60T 2201/022* (2013.01); *B60T 2210/32* (2013.01); *B60W 30/16* (2013.01)

(58) Field of Classification Search
USPC .......................................................... 701/23
See application file for complete search history.

(56) References Cited

U.S. PATENT DOCUMENTS

| | | | |
|---|---|---|---|
| 2012/0239265 A1 | 9/2012 | Kato et al. | |
| 2014/0052355 A1 | 2/2014 | Heinrichs-Bartscher et al. | |
| 2015/0360687 A1* | 12/2015 | Meyer | B60W 10/20 |
| | | | 701/70 |
| 2016/0001775 A1* | 1/2016 | Wilhelm | B60W 30/085 |
| | | | 701/25 |
| 2018/0052463 A1* | 2/2018 | Mays | B60W 60/007 |
| 2018/0154777 A1* | 6/2018 | Hall | B60L 7/18 |
| 2019/0206261 A1* | 7/2019 | Szymczak | B60W 30/16 |
| 2020/0130662 A1* | 4/2020 | Buerkle | B60W 30/09 |
| 2021/0300306 A1* | 9/2021 | Costin | B60T 7/22 |
| 2023/0242158 A1* | 8/2023 | Katzourakis | B60W 30/181 |
| | | | 701/23 |

FOREIGN PATENT DOCUMENTS

| | | | | |
|---|---|---|---|---|
| DE | 102004056118 A1 | | 5/2006 | |
| DE | 102005046841 A1 | | 4/2007 | |
| DE | 102007058192 A1 | | 6/2009 | |
| DE | 102009057836 A1 | * | 6/2011 | ............... B60T 7/22 |
| DE | 102010006214 A1 | * | 8/2011 | ............... B60T 7/22 |
| DE | 102014004110 A1 | | 9/2015 | |
| DE | 102018122865 A1 | * | 3/2020 | ............ B60Q 9/008 |
| EP | 2287059 A2 | | 2/2011 | |
| GB | 2511748 A | * | 9/2014 | ............... B60T 7/22 |
| WO | WO-2013064705 A1 | * | 5/2013 | ............ B60R 21/013 |
| WO | WO-2014139930 A2 | * | 9/2014 | ............... B60T 7/22 |
| WO | WO-2017220174 A1 | * | 12/2017 | |

* cited by examiner

METHOD FOR THE EMERGENCY BRAKING OF AN EGO-VEHICLE AND EMERGENCY BRAKING SYSTEM

CROSS-REFERENCE TO PRIOR APPLICATIONS

This application is a continuation of International Application No. PCT/EP2019/072421, filed on Aug. 22, 2019, which claims priority to German Patent Application No. DE 10 2018 122 865.1, filed on Sep. 18, 2018. The entire disclosure of both applications is incorporated by reference herein.

FIELD

The invention relates to a method for emergency braking of a subject vehicle and to an emergency braking system.

BACKGROUND

As emergency braking systems, AEBS (Advanced Emergency Brake Systems) are in particular known which initially record and evaluate measurement signals of a surroundings detection system, in particular interval signals, in a standby mode, and which are activated if an emergency braking situation, that is to say in particular an imminent or impending accident which the driver can likely no longer prevent or can no longer prevent alone, is identified. For an AEBS, an AEBS cascade is provided, in accordance with which a first warning is initially output, for example visually, acoustically or haptically, before the emergency braking, for example at least 1.4 seconds before this. This gives the driver the opportunity to react to this; it is thus possible for the driver, for example depending on the traffic situation, to initiate an evasive maneuver and change lanes, or to themself initiate braking. After the first warning, partial braking is generally initiated, that is to say braking with limited braking force. Shortly before the emergency braking, a second warning is output, and then the emergency braking is initiated as full braking, that is to say with full brake pressure.

In platooning systems or systems for initiating automated convoy travel (column travel), two or more vehicles have a data connection (V2V, vehicle-to-vehicle communication) to one another. This allows the vehicles of the group or convoy to communicate with each other such that, for example, the vehicle in front immediately communicates imminent or initiated braking to the rear vehicles, such that the rear vehicles do not have to first detect the braking operation of the front vehicle, but can immediately initiate a corresponding braking operation, in particular with mutually adapted brake pressures or setpoint decelerations. Such platooning systems allow very small intervals of for example 15 m to the respective vehicle in front, and thus a significant fuel saving. However, they require a corresponding V2V data connection between the vehicles with standardized instruction sets, wherein the technical equipment, for example the condition of the brakes, must also be adequately adapted.

Autonomous adaptive cruise control systems (ACC, Adaptive Cruise Control) serve as comfort systems and generally have a surroundings detection system, such as for example a radar device, in order to maintain a constant interval to the vehicle in front by closed-loop control through autonomous braking and engine interventions. As comfort systems, the maximum deceleration and the braking ramps, that is to say the change in the deceleration with respect to time, are limited.

Problems also arise with the conventional surroundings detection systems based on radar detectors or radar measuring devices. For example, radar systems may for example incorrectly identify objects as static obstructions, for example bridges. Even metal cans or foils may be incorrectly identified as collision-causing static objects. For this reason, too, the warning cascade is justified, and thus the performance of AEBS systems is limited.

SUMMARY

In an embodiment, the present invention provides a method for emergency braking of a subject vehicle, comprising: detecting, using a first surroundings detection system of the subject vehicle traveling in a direction of travel, a front area in front of the subject vehicle; if an object is detected in the front area, determining that a reliable target detection situation is present if at least the following target detection situation criteria are fulfilled: the detected object is a vehicle in front traveling in the direction of travel, the vehicle in front is followed over a minimum following period, in the minimum following period, the same vehicle in front is followed, providing an autonomous emergency braking system which is in an AEBS standby mode during travel outside an emergency braking situation; if an emergency braking situation is detected outside of a reliable target detection situation, switching the autonomous emergency braking system to an active AEBS mode with an AEBS cascade comprising a first driver warning, subsequent partial braking, and subsequent emergency braking; and if an emergency braking situation is detected in a reliable target detection situation, switching the autonomous emergency braking system to an active AEBS following mode with emergency braking without prior driver warning.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 2 shows the corresponding illustration with a vehicle cutting in;

DETAILED DESCRIPTION

Figure 1:
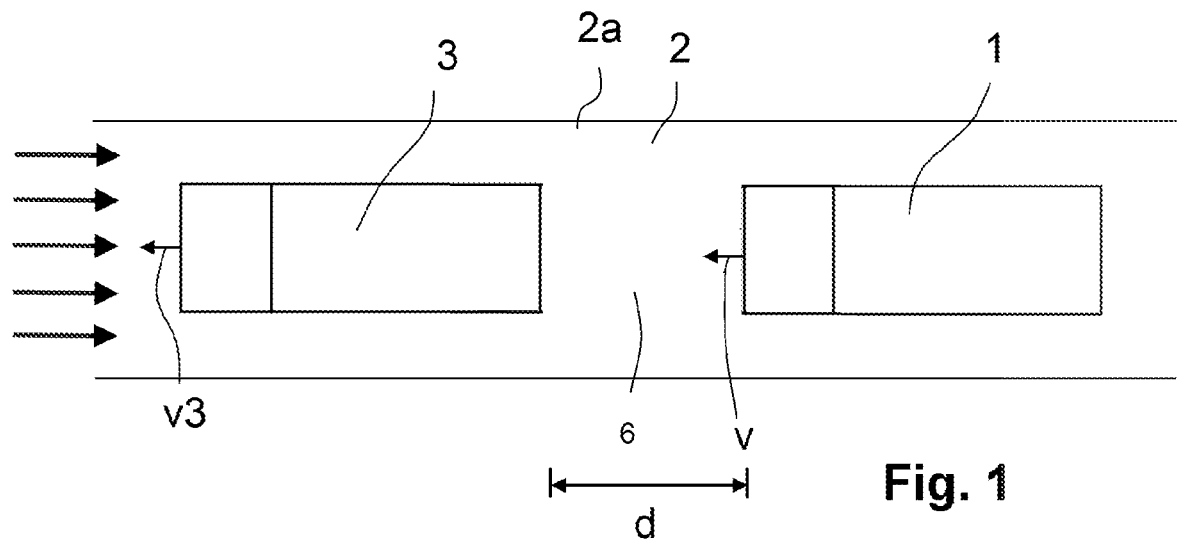
FIG. 1 shows a side view of a column composed of two vehicles with a vehicle in front and a subject vehicle in a plan view.

In an embodiment, the present invention provides a method for emergency braking and an emergency braking system which make a high level of safety possible.

The method according to the invention can in particular be carried out with an emergency braking system according to the invention; the emergency braking system according to the invention can in particular use a method according to the invention.

The AEBS system generally has a standby mode in which at least criticality criteria are checked, in the event of the fulfilment of which an emergency braking situation, that is to say an accident that will occur or is likely to occur without additional braking interventions, or an accident that will occur and the severity of which can possibly be reduced, is identified. If the criticality criteria are fulfilled, the AEBS system switches from the standby mode to an active mode, specifically to an AEBS standard mode (AEBS mode) or an active AEBS following mode depending on target detection situation criteria.

Provision is thus made to shorten the conventional AEBS cascade of an active AEBS standard mode (AEBS mode) and to initiate an active AEBS following mode if a reliable target detection situation is detected, which is defined by target detection situation criteria. Here, the target detection situation criteria relate in particular to the detected object in front and evaluate the present travel situation behind the detected object in front. This is based on the concept that objective criteria can be defined that can ensure sufficient certainty that a shortening of the conventional AEBS cascade does not cause any or any relevant higher risks, but allows a significant reduction of the risk of an accident or at least a significant reduction of the severity of the accident.

By contrast to the active AEBS mode with the AEBS cascade composed of a warning-partial braking-full braking sequence, the active AEBS following mode in particular does not have any preceding driver warning. Here, the AEBS following mode can directly initiate full braking or firstly partial braking and then full braking.

According to one embodiment, the presently inactive AEBS, which is in standby mode, may already continuously evaluate whether the target detection situation criteria are fulfilled and therefore a target detection situation is present; it is thus then possible, if an emergency braking situation is determined, for either the conventional active AEBS mode or the active AEBS following mode to be directly initiated.

As an alternative to this, the AEBS may perform the assessment of whether or not a target detection situation is present, and then access present measurement data and temporarily stored measurement data ascertained in a previous period, only in the event of detection of an emergency braking situation.

The driver can be informed when a target detection situation is presently detected, that is to say in particular when the target detection situation criteria are fulfilled when the AEBS is presently in standby mode. Active activation by the driver in an emergency braking situation is however not provided.

In principle, the method according to the invention may be provided independently of an ACC system that is provided. Thus, during conventional travel without ACC, the emergency braking system can distinguish whether a conventional situation or a target detection situation is present.

If an ACC system is provided and active, it is possible according to one embodiment for signals or ascertained data of the ACC system, which itself represents a comfort system and not a safety system, to be included, in particular if the ACC system is already also evaluating one of the target detection situation criteria or performing an evaluation from which one or more of the target detection situation criteria can be derived.

By contrast to a platooning system, no V2V is available for coordinating the braking behavior of the vehicle in front and of the subject vehicle, such that the emergency braking system makes the decision to shorten the AEBS cascade without such coordination with the vehicle in front.

In particular, the following are provided as suitable target detection situation criteria:

According to a first target detection situation criterion, the surroundings detection system, in particular the radar device of the vehicle, detects a vehicle in front traveling in the direction of travel of the subject vehicle in the front area in front of the subject vehicle. In particular if a radar device is used, this results in considerable advantages, because the radar system limits relate in particular to static objects and instances of incorrect detection generally do not occur in the case of moving objects. If the object in front is likewise moving in the direction of travel, a following travel situation can thus also be distinguished from situations which are less safe, such as a crossing vehicle or pedestrians. Here, "in the direction of travel of the subject vehicle" is to be understood in particular to mean a movement of the vehicle in front which is traveling on the same traffic lane of the road, possibly with a slight transverse component. The vehicle in front may preferably also be traveling with a slight offset in the transverse direction, in particular in the same traffic lane.

According to a second target detection situation criterion, the vehicle in front is followed for at least a minimum time or minimum following time, for example with an object lifetime longer than 30 seconds. It can thus be automatically identified that the vehicle in front is traveling in a correspondingly uniform manner, allowing sufficient certainty for the evaluation of the vehicle in front. It is thus in particular also possible for objects that have been detected for a short time, and which are evaluated as not being suitable for reliable target detection situation, to be excluded.

According to a third target detection situation criterion, it is determined that, in the minimum following period, it is always the same object that is detected as the vehicle in front, that is to say not changing objects.

These three target detection situation criteria thus in particular ensure that no situations are present in which driver intervention could be advantageous, for example because an object is crossing the road; in such a situation, the driver can possibly better assess whether to react for example by means of a steering maneuver or else by partial braking or even by not braking, or by means of a combination of a braking operation and a steering maneuver. Thus, if one of the target detection situation criteria is not fulfilled in the conventional active AEBS mode, information is output to the driver in accordance with the AEBS cascade.

Furthermore, as a further, for example fourth, target detection situation criterion, it may be provided that a relative transverse speed of the vehicle in front in relation to the subject vehicle lies below a transverse speed limit value provided for this purpose. In this way, it is possible in particular for the first criterion of the same direction of travel to be further enhanced or specified. Furthermore, it can also be detected in this way that the vehicle in front is not presently starting to veer off to the side and may subsequently intend to change lanes.

As a further, for example fifth target detection situation criterion, the detection of a lane change of the vehicle in front, that is to say in particular an intended lane change or a lane change that has already been initiated, for example with a turn signal indication by the vehicle in front and/or an already partial departure from the traffic lane, may be stipulated as an exclusion criterion.

As a further, for example sixth target detection situation criterion, it may be provided that no second detection object moves between the subject vehicle and the vehicle in front, in particular that no cutting-in maneuver of a second detection object, for example from an adjacent traffic lane, is occurring. It is recognized here that such a cutting-in process can lead to complex situations and, for example, an evasive maneuver by the driver can bring advantages.

As a further, for example seventh target detection situation criterion, it may be provided that the vehicle in front is classified in an object class, for example truck, which does not change during the minimum following period. It can thus be ruled out that the object in front is identified incorrectly.

Further target detection situation criteria may be in each case one or more of the following criteria:

The (time and/or spatial) interval to the vehicle in front lies within a specified interval range, such that, in particular, no excessively large intervals, that is to say greater than an upper limit interval value, are detected as reliable ZES, which lead to rapid emergency braking.

A relative speed of the vehicle in front in relation to the subject vehicle lies within a specified speed tolerance range, so as not to detect problematic situations with significantly different speeds.

The vehicle in front is classified in an admissible object class, for example truck or passenger car, such that in particular atypical vehicle classes, in the case of which individual action may optionally be better, can be excluded.

An ACC system is already active and is adjusting the interval to the vehicle in front by closed-loop control to an ACC target interval; this may be provided in particular if combined closed-loop control of the AEBS (safety system) and ACC system (comfort system) is present in the vehicle. In principle, there is otherwise no need for active ACC.

The emergency braking system according to the invention thus has in particular a surroundings detection system such as for example a radar device, and a control device for receiving the measurement signals and outputting control signals, in particular to the vehicle brakes.

Figure 2:
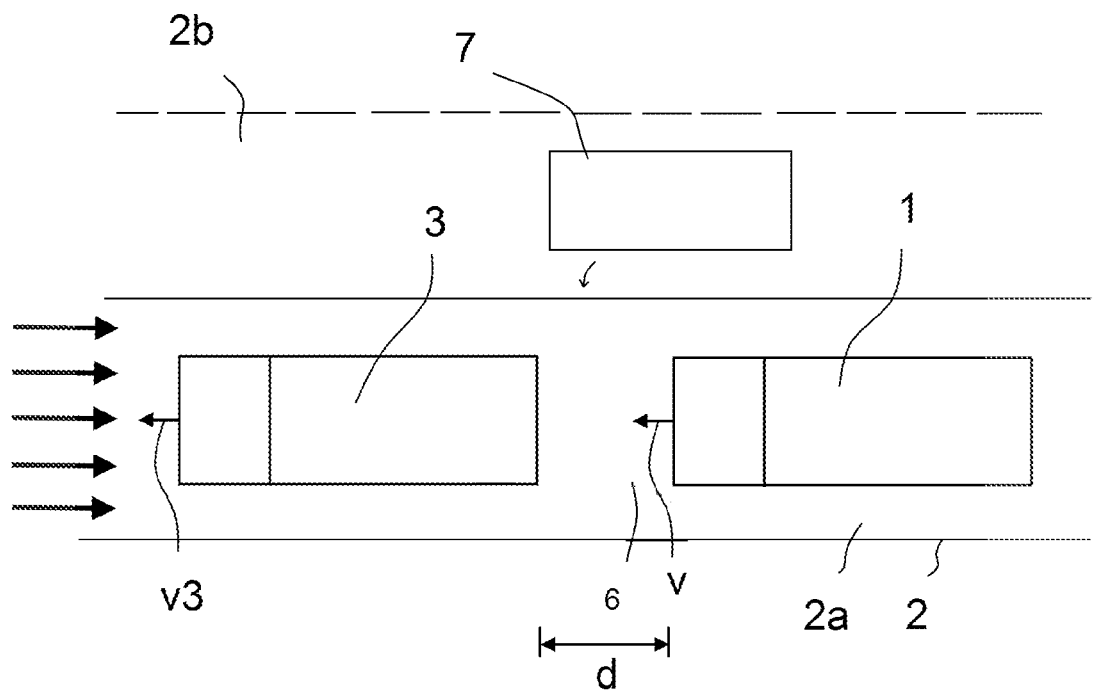

A subject vehicle 1 is traveling on a traffic lane (road) 2, in its own traffic lane 2a according to the plan view of FIG. 2. Traveling in the front area 6 in front of the subject vehicle 1 is a vehicle in front 3 which has no data connection, or no data connection with autonomous transmission of driving dynamics data and/or control signals for vehicle interventions, in particular braking operations, to the subject vehicle 1.

Figure 3:
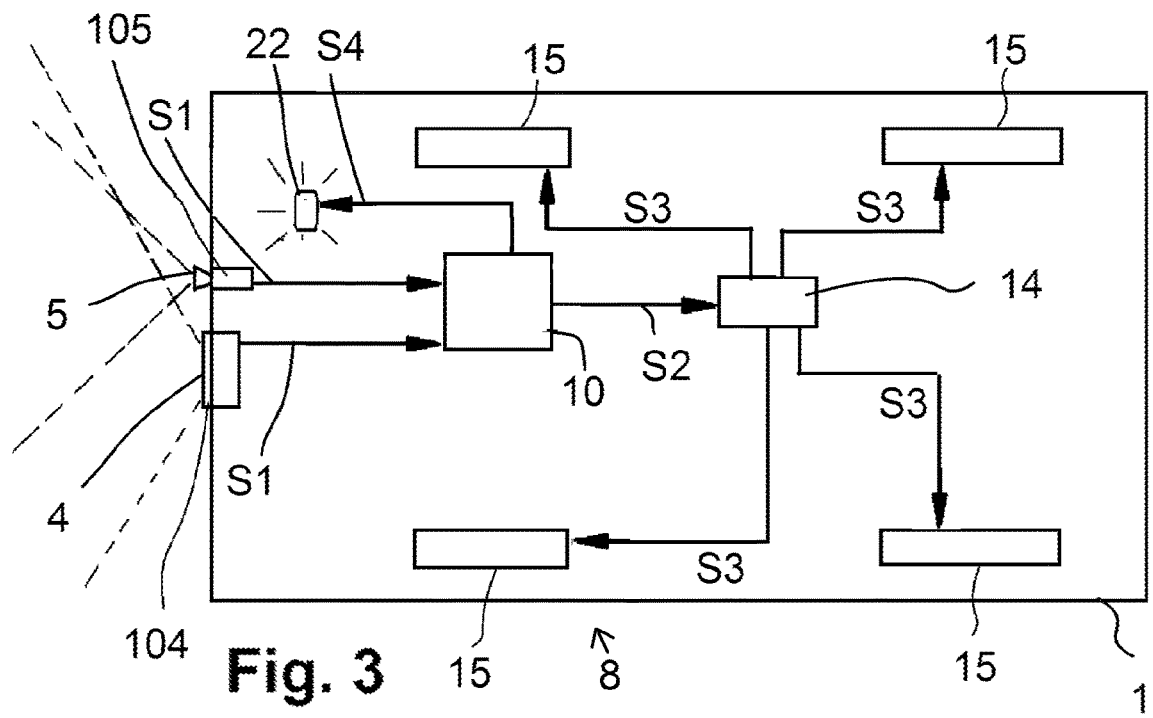
FIG. 3 shows a block diagram of a closed-loop control system according to the invention.

According to FIG. 3, the subject vehicle 1 has a first surroundings detection system 104 with a radar device 4, with which an interval d to an object in front 3 can be detected. In addition, the subject vehicle 1 may have other surroundings detection systems, for example a second surroundings detection system 105 with a camera 5, by means of which the object in front 3 can also be detected qualitatively and, if necessary, classified. The subject vehicle 1 also has an automatic emergency braking system, that is to say Advanced Emergency Brake Systems (AEBS) 8, which has the first surroundings detection system 104 and a control device 10, wherein the control device 10 of the emergency braking system 8 receives first measurement signals S1 of the radar device 4 and of the camera 5. According to the embodiment shown, the control device 10 outputs brake request signals S2 to a brake control device 14 of the brake system, which then outputs brake control signals S3 to wheel brakes 15; the control device 10 may however in particular also be integrated into the brake control device 14, that is to say may thus, as a uniform control device 10, 14, output the brake control signals S3.

If necessary, it is also possible for an autonomous adaptive cruise control mode ACC to be set in which the front area 6 is detected in a known manner by means of at least the first surroundings detection system 104, that is to say with the radar device 4, and possibly also by means of the second surroundings detection system 105 with the camera 5, such that a constant spatial interval d and/or time interval dt can be set in the presence of a constant differential speed $\Delta v=0$ between the vehicle in front 3 and the subject vehicle 1, that is to say as an autonomous interval-maintaining system.

In principle, a platooning mode may also be possible in which the subject vehicle exchanges signals with other vehicles, for example the vehicle in front 3. In the method described below, however, no data transmission with the vehicle in front 3 is provided, that is to say no platooning is involved.

In a standby mode, the AEBS 8 receives the measurement signals S1 of the surroundings detection system 104 and, on the basis of known criticality criteria KK, evaluates whether an accident, that is to say in particular a collision with the vehicle in front, is imminent. For this purpose, in particular, a system of equations can be set up for the intervals in the second order of time, that is to say with the interval d and also the speeds v (subject speed) and v3 of the object in front and also the longitudinal accelerations a and a3.

Here, the subject vehicle 1 and the vehicle in front 3 do not exchange any data regarding the initiation of braking operations.

The AEBS 8 or the control device 10 continues to evaluate the respective driving situation in order to select its active state in a manner dependent on this evaluation. A standard driving situation SFS is initially present. In such a standard driving situation, if it is identified that specified criticality criteria KK are fulfilled and therefore an emergency braking situation (emergency situation) ES is present, that is to say an accident will occur and the driver will likely not avert this, that is to say in order to avoid an accident, and in principle also, in the event of reliable determination of an accident, in order to reduce the severity of the accident, the control device 10 automatically activates an active AEBS standard mode AEBS-SM, which provides an AEBS cascade AEBS-K composed of driver warning, partial braking and emergency braking. The driver is thus initially warned in order that they can possibly themself perform suitable braking and/or steering interventions, and only then is partial braking initiated, whereupon a further warning is possibly output, and then the emergency braking is performed as full braking.

Furthermore, it is provided that the control device 10 automatically evaluates the driving situation with regard to whether there is sufficient reliability in the evaluation of following travel behind the vehicle in front, and in particular there are no particular signs that a reaction of the driver other than full braking is to be expected. It is then assessed that a shortening of the conventional AEBS cascade AEBS-K results in no or no relevant higher risks, but allows a significant reduction in the risk of an accident or at least a significant reduction in the severity of an accident.

Figure 4:
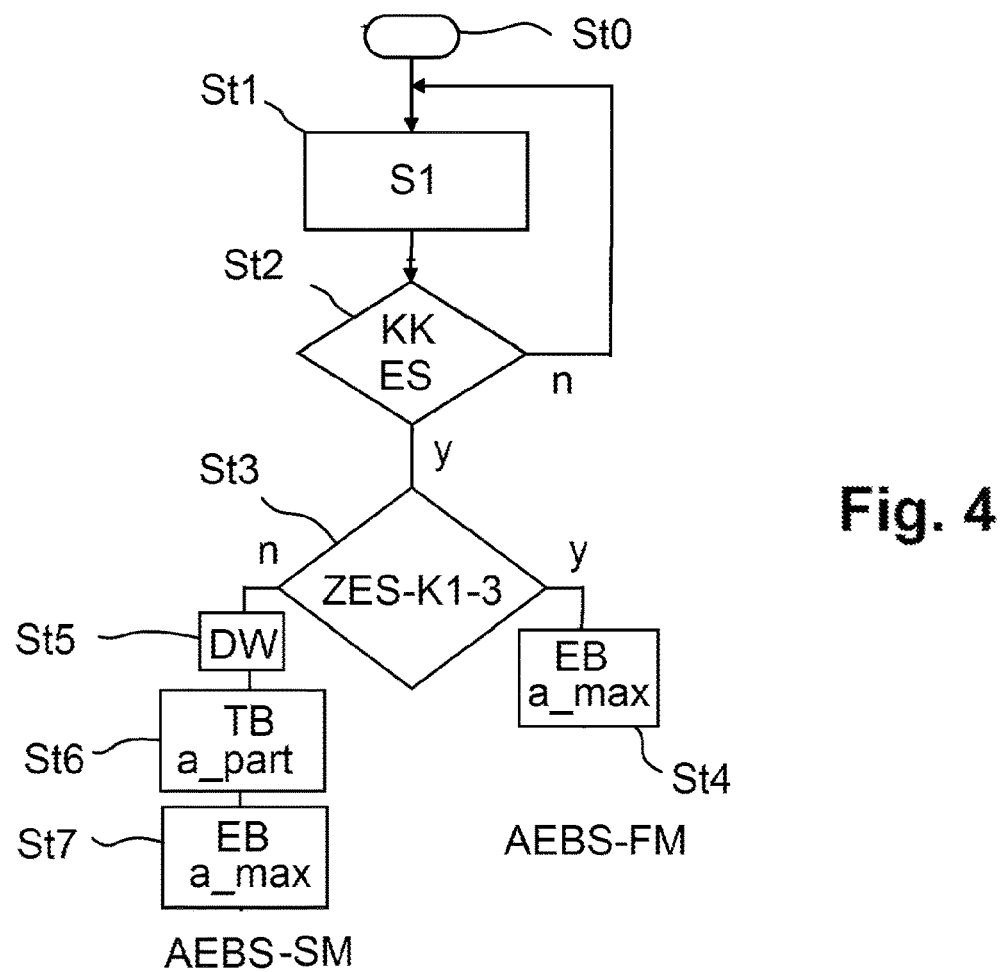
FIG. 4 shows a flow diagram of a method according to the invention.

The flow diagram of FIG. 4 thus shows that, in step St1, the control device 10, in the standby mode, receives the measurement signals S1, in step St2, decides whether criticality criteria KK are fulfilled and an emergency braking situation (emergency situation) ES is present, if this is the case, it is subsequently decided in step St3 whether the ZES criteria or target detection situation criteria (decision criteria) ZESK1 to at least ZESK3, preferably also the further target detection situation criteria, are fulfilled, if these are fulfilled, then, according to branch y, step St4 with active AEBS following mode AEBS-FM is initiated, that is to say full braking EB with maximum (negative) acceleration a_max, if these are not fulfilled, then, following branch n, steps St5, St6, St7 are initiated, which represent the AEBS cascade of the conventional active AEBS or AEBS standard mode AEBS-SM.

It is also possible here for steps St2 and St3 to be interchanged, that is to say for an ascertainment to be performed in advance as to whether a target detection situation ZES is present, and then steps St4 or else St5 to St7 to be initiated if step St2 is fulfilled.

In particular, in step St3, a following driving situation FS in relation to the vehicle in front 3, which ensures sufficient certainty, is to be identified. For this purpose, the following target detection situation criteria ZESK are provided:

First target detection situation criterion ZESK1: the radar device 4 detects a vehicle in front 3 as the object in front, that is to say a moving object traveling in the direction of travel F, that is to say v_3>0.

In this way, it is in particular also achieved that the radar system limits, which are problematic in the case of static objects, for example the incorrect identification of irrelevant objects such as bridges and for example dirt, paper or road edges as interval objects, can be excluded. This takes into account the knowledge that the detection of moving objects 3 by a radar device 4 is very reliable.

Second target detection situation criterion ZESK2: the vehicle in front 3 is detected continuously over at least a minimum following period t_min, third target detection situation criterion ZESK 3: in the minimum following period $t_{min}$, it is always the same object that is detected as the vehicle in front 3, that is to say not changing objects.

Furthermore, the following target detection situation criteria ZESK may be provided:

Fourth target detection situation criterion ZESK4—a relative transverse speed Δvy of the vehicle in front 3 in relation to the subject vehicle 1 lies below a transverse speed limit value Δvy_tres.

As a further, for example fifth, target detection situation criterion ZESK5, it may be provided that the vehicle in front 3 is not intending to perform, initiating or performing a lane change. Such a lane change or an intention to perform same may be identified for example from identification of an active turn signal or from the transverse dynamics driving behavior.

As a further, for example sixth target detection situation criterion ZESK6, no second detection object 7 or no third object moves between the subject vehicle 1 and the object in front 3, in particular no cutting-in maneuver of a second detection object occurs, for example from an adjacent traffic lane 2b as shown in FIG. 2: if it is detected that the second detection object 7 is initiating or is already performing a cutting-in process, a target detection situation can thus be excluded.

As a further, for example seventh target detection situation criterion ZESK7, it may be provided that the vehicle in front 3 is classified in an object class OC, for example OC2 for truck, which does not change during the minimum following period $t_{min}$.

Furthermore, one or more of the following target detection situation criteria ZESK may be provided:

Eighth target detection situation criterion ZESK8—the spatial or time interval d, dt to the vehicle in front 3 is approximately constant. For this purpose it may for example be checked whether a change with respect to time dd of the spatial interval d and/or a change with respect to time ddt of the time interval dt lies within a following interval range of Δd_lim of ±1 m, or within a following time interval range Δt_lim of 0.1 seconds; such a value is assessed as being approximately constant.

Ninth target detection situation criterion ZESK9—a relative speed Δv=v1−v3, that is to say the difference between the subject speed of the subject vehicle and the speed of the vehicle in front 3 lies within a specified speed tolerance range Δv_lim.

Tenth target detection situation criterion ZESK10—the vehicle in front 3 is classified in an admissible object class OC, for example OC2 for trucks. Here, other vehicle types such as passenger cars, tractors etc. should not be taken into consideration for safety reasons.

Eleventh target detection situation criterion ZESK11—an adaptive cruise control system for setting an automatic adaptive cruise control mode ACC, with which closed-loop control an interval d, dt to the vehicle in front 3 is performed, is active.

The control device 10 can, already in the standby mode, check in each case whether the required target detection situation criteria are fulfilled, in order to then immediately set either the AEBS standard mode AEBS-SM or the AEBS following mode AEBS-FM in the event of an emergency situation being identified.

Figure 5:
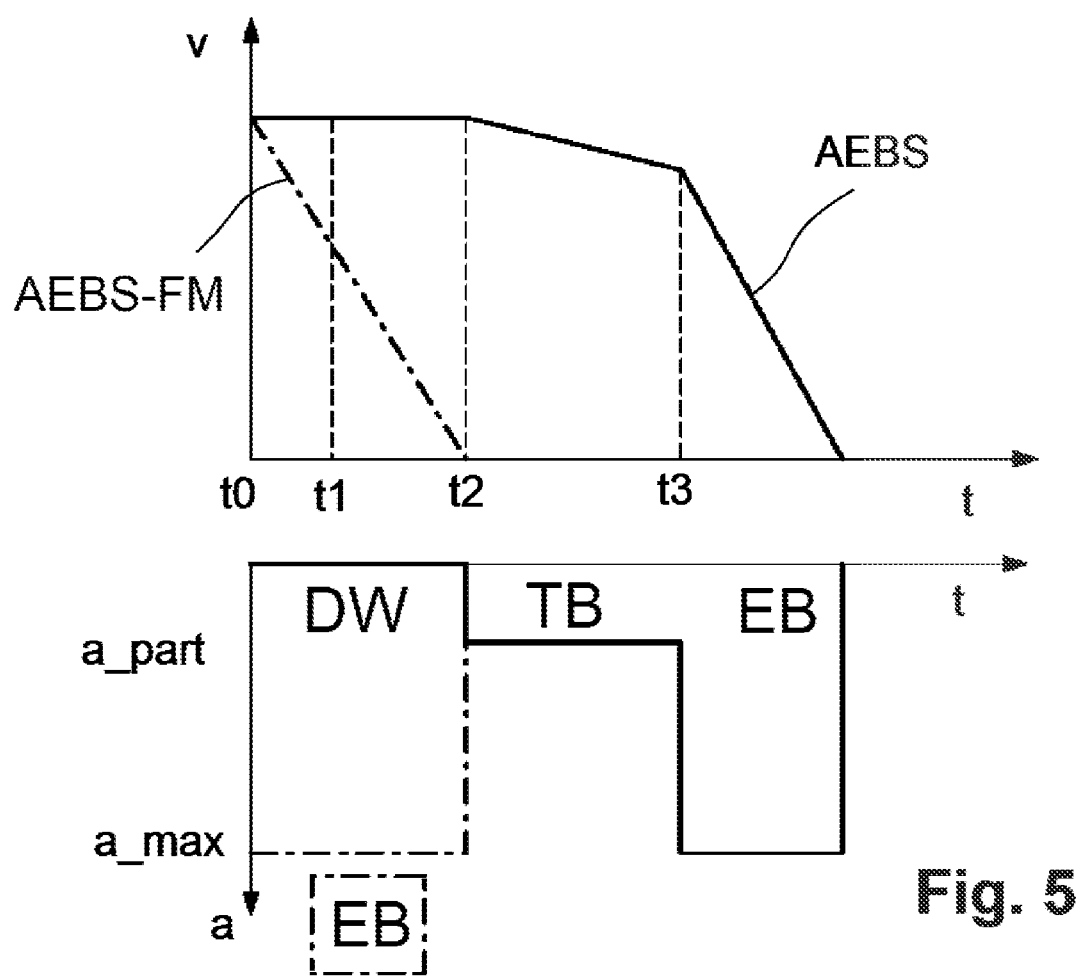
FIG. 5 shows time diagrams of the speeds and accelerations in the AEBS standard mode and AEBS following mode.

FIG. 5 shows a braking operation in the AEBS standard mode AEBS-SM and in the AEBS following mode AEBS-FM, in each case as a time diagram of the speed v and of the acceleration a, which is plotted downward here because decelerations, that is to say negative accelerations, are involved.

In FIG. 5, at the time t0, the radar device 4 detects a strong deceleration or emergency braking of the vehicle in front 3.

In the AEBS standard mode AEBS-SM, the control device 10 does not immediately perform emergency braking. Certain criticality criteria KK must first be fulfilled, that is to say it must be critical enough. If this is fulfilled at time t1, the 1st warning signal is firstly output to the driver, then, at the time t2, the 2nd warning associated with partial braking TB with partial acceleration (or braking) a_part, and then, at the time t3, full braking EB with (in terms of magnitude) maximum negative acceleration a_max.

In the AEBS following mode AEB S-FM, however, the control device 10 may initiate a maximum (full) braking torque, that is to say full braking with (in terms of magnitude) maximum acceleration a_max, immediately at the time t0 upon identification of a deceleration of the vehicle in front 3, and thus quickly come to a standstill earlier in accordance with the dash-dotted line.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE DESIGNATIONS (PART OF THE DESCRIPTION)

1 Subject vehicle
2 Traffic lane, road
2a Subject traffic lane
3 Object in front, in particular vehicle in front
4 Radar device
5 Camera
6 Front area in front of the subject vehicle 1
7 Third object
8 Emergency braking system
10 Control device
14 Brake control device
15 Service brakes
22 Display device
104 First surroundings detection system, in particular with radar device 4
105 Second surroundings detection system, in particular with camera 5
a_max Maximum negative acceleration during full braking EB
a_part Negative partial acceleration during partial braking TB
d Spatial interval between the subject vehicle 1 and the vehicle in front 3
dt Time interval between the subject vehicle 1 and the vehicle in front 3
t1 First time, time of fulfilment of the KK
t2 Second time, time of the 2nd warning and/or initiation of the partial braking
t3 Time of the emergency braking
$t_{min}$ Minimum following period
ddt, dd Change with respect to time of the time interval dt
ddt, dd Change with respect to time of the spatial interval d
Δd_lim Spatial interval range
Δt_lim Time interval range
Δv_lim Specified speed tolerance range
Δvy_tres Transverse speed limit value
Δvy Relative transverse speed
Δv Relative speed
KK Criticality criteria for emergency braking
ACC Adaptive cruise control
d_ACC ACC target spatial interval
t_ACC ACC target time interval
AEBS-GM AEBS standby mode
AEBS-SM AEBS standard mode (active)
AEBS-FM AEBS following mode (active)
AEBS-K AEBS cascade
EB Emergency braking
ES Emergency braking situation
TB Partial braking
F Direction of travel
DW Driver warning
OC Object class
OC2 Object class truck
OC3 Object class passenger car
SFS Standard driving situation
ZES Reliable target detection situation
ZESK Target detection situation criterion
ZESK1-ZESK11 First to eleventh target detection situation criterion
S1 Measurement signals
S2 Brake request signals
S3 Brake control signals
S4 Display signal to the driver or the display device 22

What claimed is:

1. A method for emergency braking of a subject vehicle, comprising:
    detecting, using a first surroundings detection system of the subject vehicle traveling in a direction of travel, a front area in front of the subject vehicle;
    if an object is detected in the front area, determining that a reliable target detection situation is present if at least the following target detection situation criteria are fulfilled:
        the detected object is a vehicle in front traveling in the direction of travel,
        the vehicle in front is followed over a minimum following period,
        in the minimum following period, the same vehicle in front is followed,
    providing an autonomous emergency braking system (AEBS) which is in an AEBS standby mode during travel outside an emergency braking situation;
    if an emergency braking situation is detected outside of a reliable target detection situation, switching the autonomous emergency braking system to an active AEBS mode with an AEBS cascade comprising a first driver warning, subsequent partial braking, and subsequent emergency braking; and
    if an emergency braking situation is detected in a reliable target detection situation, switching the autonomous emergency braking system to an active AEBS following mode in which emergency braking is performed without waiting for a driver warning to be issued.

2. The method of claim 1, wherein, in the active AEBS following mode, the emergency braking is also initiated without waiting for a partial braking to be initiated.

3. The method of claim 1, wherein the target detection situation criteria further comprise:
    a relative transverse speed of the vehicle in front in relation to the subject vehicle being below a transverse speed limit value.

4. The method of claim 1, wherein the target detection situation criteria further comprise:
the vehicle in front is not intending to perform, initiating, or performing a lane change.

5. The method of claim 1, wherein the target detection situation criteria further comprise:
no second detection object moves between the subject vehicle and the object in front.

6. The method of claim 5, wherein the projected period comprises the minimum following period, and
wherein no second detection object moves between the subject vehicle and the object in front comprises not ascertaining that a cutting-in maneuver of a second detection object is intended or being initiated or performed.

7. The method of claim 6, wherein the cutting-in maneuver of the second detection object is from an adjacent traffic lane.

8. The method of claim 1, wherein the target detection situation criteria further comprise:
it is provided as a further target detection situation criterion (ZESK7) that the vehicle in front being classified in an object class, which does not change during the projected period.

9. The method of claim 8, wherein the object class comprises truck.

10. The method of claim 1, wherein the subject vehicle and the vehicle in front do not perform any exchange of data regarding an initiation of braking operations during the active AEBS following mode.

11. The method of claim 1, wherein the target detection situation criteria further comprise one or more of the following:
a spatial or time interval to the vehicle in front being sufficiently constant,
a relative speed of the subject vehicle in relation to the vehicle in front lies within a predetermined speed tolerance range,
the vehicle in front is classified in an admissible object class.

12. The method of claim 11, wherein sufficiently constant comprises lying within a specified interval range, and wherein the admissible object class comprises truck or passenger car.

13. The method of claim 1, wherein the target detection situation criteria further comprise:
an adaptive cruise control system for setting an automatic adaptive cruise control mode being active, with which an interval to the vehicle in front is adjusted by closed-loop control to an ACC target interval.

14. The method of claim 1, wherein the first surroundings detection system has an interval measuring system configured to ascertain an interval to an object in front, the interval measuring system comprising a radar interval measuring system, and a second surroundings detection system comprising a camera configured to unambiguously identify the vehicle in front and/or of the object class of the vehicle in front.

15. The method of claim 1, wherein, if a reliable target detection situation is detected, a display signal is output to the driver for information regarding an active AEBS following mode upon identification of an emergency braking situation.

16. The method of claim 15, wherein the emergency braking situation is identified if criticality criteria are fulfilled, and
wherein, if the criticality criteria are not fulfilled, a standard driving situation with the AEBS standby mode is present.

17. An emergency braking system for a subject vehicle, comprising:
a first surroundings detection system configured to detect front surroundings in front of the subject vehicle; and
a control device configured to receive measurement signals of the first surroundings detection system and to carry out the method of claim 1.

18. The emergency braking system of claim 17, wherein the first surroundings detection system comprises an interval measuring system comprising a radar device.

19. The emergency braking system of claim 17, wherein the control device comprises an ACC control device configured to carry out adaptive cruise control.

* * * * *